Oct. 31, 1939.     H. SIEMUND     2,178,524
DIPPING AND MEASURING APPARATUS
Filed Nov. 12, 1938
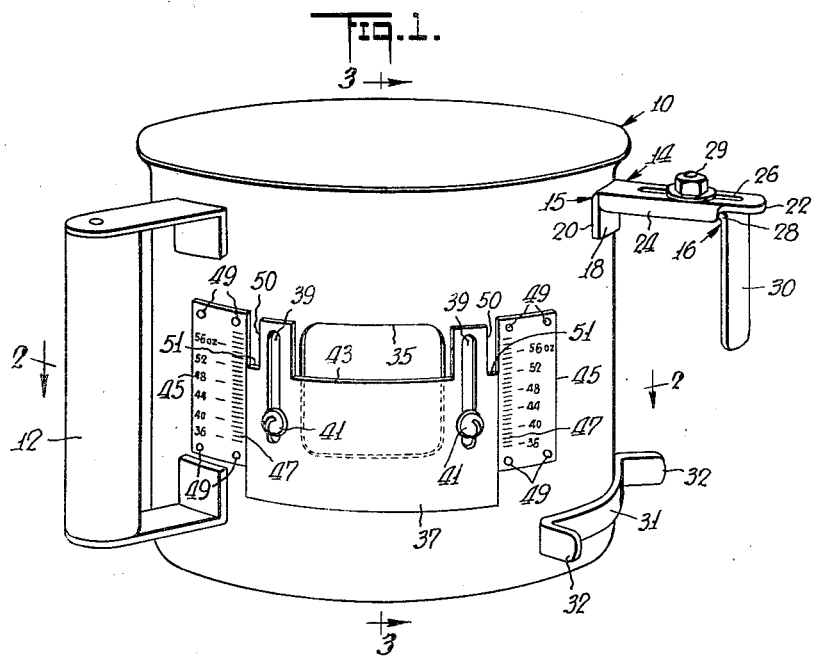
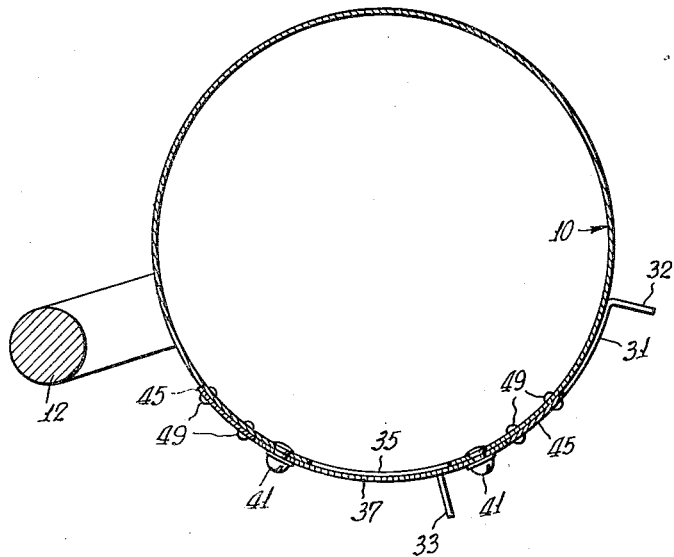
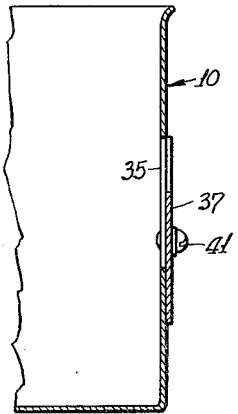
INVENTOR
*Herman Siemund*
BY *Richard J. Cowling*
ATTORNEY Patented Oct. 31, 1939

2,178,524

UNITED STATES PATENT OFFICE 2,178,524

DIPPING AND MEASURING APPARATUS

Herman Siemund, Chicago, Ill., assignor to Joe Lowe Corporation, New York, N. Y., a corporation of Delaware Application November 12, 1938, Serial No. 239,907

5 Claims. (Cl. 73—165)

The present invention relates to the art of dipping and measuring materials which are of a pourable nature, and it has particular relation to improvements in a dipper and measuring apparatus for transferring a predetermined quantity of materials from one container to another.

The invention is specifically directed to improvements in the combined dipper and measuring device described and claimed in United States Letters Patent No. 1,996,207, issued April 2, 1935, to Edwin W. Kronbach, entitled "Dipping and measuring device for liquids", wherein such a device may be improved so that it is capable of use for measuring varying quantities of materials to be measured and transported within certain predetermined limitations.

In many manufacturing operations it is frequently desirable to remove a given quantity of pourable material from a large supply tank and transfer the same to a smaller container, such as a multi-cavity mold, wherein it is essential to deliver accurate predetermined volumes of material with each dipping operation in order not to overfill the latter. It is also frequently necessary in such operations to change the amount of material to be delivered to such small containers. In large plants the filling is accomplished by using expensive and complicated filling machines of an automatic or semi-automatic nature wherein such changes may be readily made with mechanism provided therefor. In the small plants the filling of such small containers is done manually with the use of a ladle or pitcher, whereby the skill of the operator is relied upon to judge the quantity or volume of material to be placed in such small containers. In such operations changes in the amount of material to be delivered materially affects the skill of the operator, and in a great many instances so delayed the filling operation that separate dippers or measuring devices were provided for the different quantities of material to be measured and transferred from time to time during production changes. Such increased quantities of dippers of various sizes involved additional expense and equipment far beyond that which was commensurate with the simple operation involved.

In order to obviate these difficulties, I have provided a combined dipper and measuring apparatus of the character described with a simple and inexpensive means whereby the amount of material to be transferred during any dipping operation may be quickly and accurately increased or decreased within a predetermined limited range.

An object of the present invention is to provide a combined dipper and measuring apparatus of the character described with simple and inexpensive means for varying its volume from time to time.

Another object of the invention is the provision of simple and inexpensive means for indicating the cubical contents of the measuring apparatus at any given setting of the varying means.

Other and further objects and advantages of the invention will be apparent from the following description, wherein a preferred form of embodiment of the invention is shown, reference being had to the accompanying drawing forming a part thereof, in which:

Fig. 1 is a perspective view of a dipping and measuring apparatus embodying the principles of my invention;

Fig. 2 is a cross-sectional view of the apparatus shown in Fig. 1, the same being taken substantially along the line 2—2 thereof; and Fig. 3 is a fragmentary sectional view of the apparatus shown in Fig. 1, the same being taken substantially along the line 3—3 thereof.

Referring now to the drawing, the apparatus consists of an open-top container 10 having a handle 12 mounted along the side thereof. Mounted on the outer sidewall of the container 10 and spaced circumferentially a substantial distance from the handle 12 is a clamping member 14, which consists of two L-shaped metal bracket members 15 and 16. The bracket member 15 has its shorter arm 18 welded or soldered to the sidewall of the container adjacent the upper edge thereof, as indicated at 20, and the longer arm 22 projects outwardly and horizontally from the sidewall of the container 10. The longer arm 22 is provided with a pair of downwardly projecting flanges 24 along its opposite sides and with a central slot 26 extending longitudinally thereof intermediate its ends. The bracket member 16 has a short arm 28 which is apertured to receive a bolt 29, and a long arm 30 which extends downwardly in spaced parallel relation to the sidewall of the container 10. The bracket member 16 may be assembled in reversed position on the bracket member 15, whereupon the arm 28 will be brought much nearer to the side wall of the container 10, thereby giving the clamping member 14 a wider range of adjustability.

Positioned centrally of and directly below the clamping member 14 and adjacent the bottom edge of the sidewall of the container 10 is a spacer bracket 31, which is arcuate in shape to conform to the shape of the container 10. The spacer bracket 31 is soldered or welded to the sidewall of the container 10 and is provided with outwardly and radially projecting end members 32 and 33, which are adapted to engage the inner surface of the sidewall of the supply tank upon which the container 10 is adapted to be suspended, thereby maintaining the container 10 in spaced vertical alignment and thus assuring a proper horizontal level for the material contained therein.

The container 10 is also provided with an opening 35 in its sidewall intermediate the handle 12 and the clamping member 14, which provides an outlet for the material collected in the container 10 in excess of that desired during the dipping operation. The opening 35 is positioned in the sidewall of the container 10 at a predetermined distance from the bottom thereof, which distance is calculated and dependent upon the smallest volume of liquid desired to be collected and transferred during the dipping operation.

In order that the apparatus will not be limited to the measurement of a single volume or quantity of material, I propose to provide the opening 35 with an adjustable cover plate 37, which is slidable vertically. Slots 39 in the cover plate 37 engage set screws 41 secured through the sidewall of the container 10 on opposite sides of the opening 35. The top edge of the cover plate 37 is recessed, as indicated at 43, so that when the tops of the slots 39 are engaging the set screws 41, the bottom of the recess 43 is in the same horizontal plane as the bottom edge of the opening 35. In this position the smallest measured volume of material will be conveyed with each dipping operation. As the slidable cover plate 37 is moved upwardly and across the bottom of the opening 35, thereby reducing its size by closing up the lowermost portion thereof, the contents of the container 10, which is the volume of material to be conveyed in a single dipping operation, is increased proportionately to the distance which the cover plate 37 has been moved over the opening 35. In this manner the apparatus may be utilized for dipping and measuring various quantities of material within the limits for which it was designed and for which it is intended to be used. Of course, each new position of the cover plate 37 over the opening 35 requires releasing the set screws 41, moving the plate 37 to its desired position over the opening 35, and then tightening the set screws 41 again to frictionally retain the plate 37 against the sidewall of the container 10 by the pressure exerted by said screws 41.

Flanking the vertical edges of the cover plate 37 are mounted a pair of plates 45, having graduations or other suitable scale indicia thereon, as indicated at 47, so that the desired volume may be readily ascertained for each position of the slidable cover plate 37. These scale plates 45 are fastened to the sidewall of the container 10 by suitable rivets 49, and are so mounted with respect to the opening 35 that the horizontal graduations 47 indicate the volume of material contained within the container 10 when the material level corresponds to such marking. To facilitate reading the liquid level, or the setting of the cover plate 37 over the opening 35 in such manner as to secure a given quantity of material during a dipping operation, I have recessed the upper portion of the vertical edges downwardly and inwardly, as indicated at 50. The bottom edges of the recesses 50, which form the shoulders 51 on the cover plate 37, are horizontally and circumferentially in alignment with the bottom portion of the recess 43, which determines the liquid level of the material in the container 10 at all times or at any given setting. In the illustration shown, the cover plate 37 is so positioned over the opening 35 as to measure and transfer exactly fifty-two ounces of material at each dipping operation, and the limits of the container 10 are between 36 and 56 ounces. Of course, smaller or larger containers may be constructed for handling correspondingly smaller or larger volumes of material. The two scale plates 45 shown in the drawing, which are positioned in horizontal alignment on opposite sides of the opening 35, permit accurate horizontal alignment of the cover plate 37 over the opening 35, and in this manner insure accurately measured volumes of material for each setting. Any inaccuracy in the horizontal alignment of the cover plate 37 will obviously cause corresponding variations in the measured quantities of material secured during a dipping operation, and the amount of material delivered will not correspond to that indicated by the reading on the scale plates 45.

Although I have only described in detail one form which my invention may assume, it will be apparent to those skilled in the art that the invention is not so limited, but that various modifications may be made therein without departing from the spirit thereof or from the scope of the appended claims.

What I claim is:

1. In a measuring container having a closed bottom, an overflow opening in the sidewall thereof spaced from said closed bottom for permitting any excess material to escape therefrom, and adjustable means slidably associated with said overflow opening for varying the size thereof by raising or lowering its effective bottom edge for changing the volume capacity of said container.

2. In a measuring container having a closed bottom, an overflow opening in the sidewall thereof spaced from said closed bottom for permitting any excess material to escape therefrom, means slidably mounted over said overflow opening for increasing or decreasing the size thereof by raising or lowering the effective bottom edge for changing the volume capacity of said container, and means associated with said first mentioned means for indicating the volume capacity of said container for the various positions of said first mentioned means.

3. In a measuring container having a closed bottom, an overflow opening in the sidewall thereof spaced from said closed bottom for permitting any excess material to escape therefrom, a vertically slidable cover plate mounted over said overflow opening for varying the volume capacity of said container by closing the bottom of said opening and thereby changing its distance from the bottom of said container, and means mounted on opposite sides of said opening and associated with said slidable cover plate for horizontally aligning said plate over said opening and indicating the volume capacity of the container at various positions of said cover plate.

4. In a hand manipulating dipping and measuring apparatus consisting of an open-top portable container having means for suspending it horizontally over the edge of a supply tank and an overflow opening through the sidewall thereof spaced from the bottom for permitting any material entrapped therein during a dipping operation in excess of a predetermined volume to drain therefrom, the combination with said opening of means including a vertically slidable cover plate for varying the effective bottom edge of said opening with respect to the bottom of said container for changing the volume capacity thereof.

5. In a hand manipulating dipping and measuring apparatus consisting of an open-top portable container having means for suspending it horizontally over the edge of a supply tank and an overflow opening through the sidewall thereof spaced from said bottom for permitting any material in excess of a predetermined volume to drain therefrom, the combination with said opening of means including a vertically slidable cover plate for varying the effective bottom edge of said opening with respect to the bottom of said container for changing the volume capacity thereof, and means associated with said cover plate positioned on opposite sides of said opening for facilitating horizontal alignment of said cover plate with respect to said opening.

HERMAN SIEMUND.